United States Patent

Ruprecht et al.

[11] Patent Number: 5,130,802
[45] Date of Patent: Jul. 14, 1992

[54] TELEVISION RECEIVING SECTION HAVING AN A/D CONVERTER WHICH SIMULTANEOUSLY PERFORMS SYNCHRONOUS DEMODULATION

[75] Inventors: Jürgen Ruprecht, Oststeinbek; Wolf-Peter Buchwald, Evessen/Hachum, both of Fed. Rep. of Germany

[73] Assignee: U.S. Philips Corporation, New York, N.Y.

[21] Appl. No.: 657,004

[22] Filed: Feb. 13, 1991

[30] Foreign Application Priority Data

Feb. 15, 1990 [DE] Fed. Rep. of Germany ....... 4004631

[51] Int. Cl.[5] .............................................. H04N 5/44
[52] U.S. Cl. .................................................. 358/188
[58] Field of Search ............... 358/188, 197, 198, 196, 358/166, 160

[56] References Cited

U.S. PATENT DOCUMENTS

| 4,670,790 | 6/1987 | Sawada | 358/188 |
| 4,686,570 | 8/1987 | Lewis | 358/188 |
| 4,727,426 | 2/1988 | Itabashi | 358/188 |
| 4,789,897 | 12/1988 | Kappeler | 358/188 |
| 4,901,151 | 2/1990 | Mehrgardt et al. | 358/188 |
| 4,974,086 | 11/1990 | Ehrhardt | 358/197 |

FOREIGN PATENT DOCUMENTS

3743727 7/1989 Fed. Rep. of Germany .

Primary Examiner—Howard W. Britton
Assistant Examiner—Sherrie Hsia
Attorney, Agent, or Firm—Edward W. Goodman

[57] ABSTRACT

In a television receiving section for receiving an analog television signal converted to an intermediate frequency by a mixer (3) and subsequently selected in an intermediate frequency filter (6) which is followed by an A/D converter (7), the intermediate frequency is an integral multiple of the sample clock frequency of the A/D converter (7) for the purpose of simultaneous demodulation of the television signal.

12 Claims, 1 Drawing Sheet

TELEVISION RECEIVING SECTION HAVING AN A/D CONVERTER WHICH SIMULTANEOUSLY PERFORMS SYNCHRONOUS DEMODULATION

BACKGROUND OF THE INVENTION

1. Field of the Invention

The invention relates to a television receiving section for receiving an analog television signal modulated on a carrier frequency, the signal being converted to an intermediate frequency by means of a mixer and subsequently selected in an intermediate frequency filter which is followed by a sample clock-controlled A/D converter.

2. Description of the Related Art

A television receiving section of this type is known from DE-OS 37 43 727, in which the carrier of the received television signal is initially converted to the conventional intermediate frequency of 38.9 MHz. The television signal thus converted occurs at the output of the intermediate frequency stage approximately in the frequency range between 33 and 40 MHz. This IF signal is then applied to an A/D converter which is clocked with approximately 20 MHz. The output signal of the A/D converter is demodulated in a circuit arrangement subsequent to the A/D converter, so that the digital composite color signal is present at the output of this circuit arrangement.

SUMMARY OF THE INVENTION

It is an object of the invention to further improve a television receiving section of the type described in the opening paragraph.

According to the invention, this object is achieved in that in the television receiving section described in the opening paragraph, the intermediate frequency is an integral multiple of the sample clock frequency of the A/D converter.

The essential advantage of coupling the intermediate frequency and the sample clock frequency in the manner described above is that the sampling of the analog television signal converted to the intermediate frequency has the result that due to aliasing or folding effects, the television signal also occurs in the baseband. Thus, simultaneously with the sampling of the IF television signal, the signal is also converted to the baseband so that a synchronous demodulation has taken place. Consequently one economizes on a digital demodulator which succeeds the A/D converter in the state of the art. The relevant advantage is not only the economy of the demodulator but also the fact that in such a demodulator unwanted signal folding products which may easily arise are avoided.

Due to the conversion to the baseband, which arises simultaneously with the sampling operation, the television signal is no longer modulated on a carrier frequency so that the A/D converter requires a smaller resolution than in the state of the art devices in which an approximately double level of the television signal modulated on a carrier frequency must be taken into account.

In one embodiment of the invention, the frequency of the sample clock is ⅓ of the intermediate frequency. With this choice of the frequency ratio between intermediate frequency and sample frequency, the spectra produced due to folding during the sampling operation are still spaced apart far enough so that they can be filtered out without too much elaborateness, while the sample frequency is relatively low so that the number of components for the A/D converter is minimized.

In accordance with a further embodiment of the invention, a signal processing operation of the digital television signal subsequent to the A/D converter is effected with an operating clock whose frequency is equal to the operating clock of the A/D converter.

Advantageously, a signal processing operation possibly subsequent to the A/D converter can be effected with the same operating clock with which also the television signal was sampled. Only one operating clock is then required for the subsequent signal processing operation and for the A/D converter.

However, if the television receiving section according to the invention is to be incorporated in an existing television chassis whose digital stages operate with a predetermined clock frequency, a further embodiment of the invention provides the possibility that the A/D converter is succeeded by a clock rate converter by means of which the clock rate is converted to a different operating clock for a subsequent signal processing operation. In this way the signal processing operation subsequent to the A/D converter can be adapted to arbitrary sample frequencies.

For all embodiments of the invention, the intermediate frequency and the sample clock must be phase-locked in the selected frequency ratio. In accordance with a further embodiment of the invention, such a phase lock may be realized advantageously in that in a television receiving section including an oscillator whose output signal is applied to the mixer, a phase discriminator is provided which compares the sample clock frequency with the intermediate frequency which is divided in conformity with the desired numerical ratio between the sample clock frequency and the intermediate frequency, the output signal of said discriminator correcting the frequency of the oscillator in such a way that the intermediate frequency and the sample clock frequency have the desired numerical ratio with respect to each other. Thus, the mixing oscillator frequency is set in accordance with the sample frequency of the A/D converter. In this way the desired phase lock of the two frequencies can be ensured.

A further embodiment of the invention is characterized in that alternatively to the received television signal converted to the intermediate frequency, an externally applied baseband television signal can be converted to the digital range by means of the A/D converter.

The television receiving section according to the invention then provides the advantage that without any change in the circuit, the A/D converter of the television receiving section can also be used for converting externally applied television signals, which are present in the baseband, and hence may originate from, for example, a video recorder, to the digital range.

All embodiments of the invention provide various possibilities for the choice of the intermediate frequency and the sample clock frequency, the appropriate possibility being chosen in dependence on boundary conditions. If, for example, the intermediate frequency is fixed, or if the conventional intermediate frequency of 38.9 MHz is to be chosen, the sample clock is determined in accordance with the desired ratio. In this exemplary case the sample clock would be fixed at 12.97 MHz if the frequency of the sample clock is to be ⅓ of the intermediate frequency. Moreover, there is also the possibility of fixing the sample clock in such a way that it is equal to one operating clock of a digital signal processing operation subsequent to the A/D converter. In this exemplary case, the operating clock would be fixed at 13.5 MHz. Dependent on the sample clock, the intermediate frequency could then be fixed at, for example, three times this value, i.e. 40.5 MHz in this case.

If the intermediate frequency as well as the frequency of a digital signal processing operation subsequent to the A/D converter are fixed and if these frequencies are not in an integral ratio with respect to each other, a clock rate converter for adapting the clock frequencies may advantageously be arranged subsequent to the A/D converter in the manner described above.

BRIEF DESCRIPTION OF THE DRAWING

Embodiments of the invention will now be described in greater detail by way of example with reference to the accompanying drawing, in which.

DESCRIPTION OF THE PREFERRED EMBODIMENT

Figure 1:
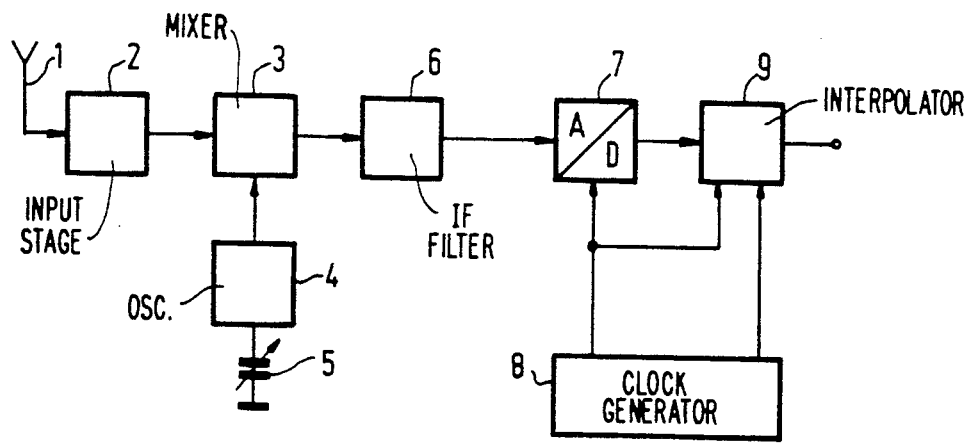
FIG. 1 is a block-schematic diagram of a first embodiment of a television receiving section.

A television receiving section shown in the form of a block-schematic diagram in FIG. 1 has an input stage 2 which receives a high-frequency composite television signal from an antenna 1 which is shown diagrammatically in FIG. 1. The input stage 2 is used for filtering out a selected reception range. The input stage 2 precedes a mixer 3 which also receives the signal from an oscillator 4. The resonance frequency of the oscillator 4 is adjustable at a desired value. For this purpose a variable capacitance 5 is shown in FIG. 1. An analog IF filter 6 follows the mixer 3. The output signal of the IF filter 6 is applied to an A/D converter 7. A sample clock signal of a desired frequency is applied by a clock generator 8 to the A/D converter 7. The resonance frequency of the clock generator 8 is coupled to the resonance frequency of the oscillator in such a way that the intermediate frequency is an integral multiple of the frequency of the clock generator 8, preferably three times this value. The A/D converter 7 is succeeded by an interpolator 9 by means of which the digital signals leaving the A/D converter 7 are converted to a different operating clock. To this end, the interpolator 9 receives from the clock generator both the A/D converter operating clock as well as the operating clock to which the digital data must be converted.

The operation of the receiving section shown in FIG. 1 will be further explained with reference to the diagram shown in FIG. 2.

In the receiving section shown in FIG. 1, the received analog television signal modulated on a high carrier frequency is converted by means of the mixer 3 and the oscillator 4 to an intermediate frequency which may be, for example, 38.9 MHz. The television signal thus converted to the intermediate frequency is then filtered out in the intermediate frequency filter 6, i.e. it is liberated from signals in the neighboring frequency range. The television signal converted to the intermediate frequency is then only present at the output of the intermediate frequency filter 6. This television signal is converted to the digital range in the A/D converter 7.

Figure 2:
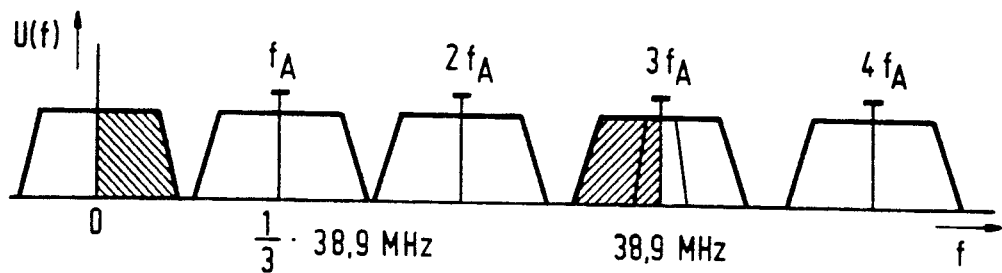
FIG. 2 is a voltage/frequency diagram to explain the television receiving section of FIG. 1.

The frequency ratios then resulting due to aliasing or folding effects are shown in FIG. 2. In the exemplary case, it is assumed that the intermediate frequency is 38.9 MHz and that the sample clock of the A/D converter 7 is ⅓ of the intermediate frequency, i.e. 12.97 MHz. FIG. 2 shows the intermediate frequency-converted television signal in the form of a hatched trapezium. As a result of the sampling of this television signal in the A/D converter 7, different signal folding products are produced so that the television signal repeatedly occurs in different frequency ranges. At each multiple of the sample frequency the television signal each time occurs twice in a mirror-inverted form around the multiples of the sample frequency, with the signals each time having their previous intermediate frequency located at the multiple values of the sample frequency. Moreover, the television signal also occurs in the baseband, i.e. a signal folding product occurs which with its previous intermediate frequency is exactly located at the frequency of zero. Together with the sampling operation and the then occurring folding, a demodulation of the television signal converted to the intermediate frequency has taken place simultaneously. This signal is also shown in a hatched form in FIG. 2.

Consequently the television signal is already present at the output of the A/D converter 7 in a digitized form and in the form converted to the baseband so that a digital demodulator can be dispensed with. This output signal of the converter 7 can be directly further processed in a subsequent digital signal processing operation, if this operation works with the same operating clock as the converter 7. If this is not the case, the interpolator 9 shown in FIG. 1 may be provided, which converts the digital signal to a different operating clock.

Figure 3:
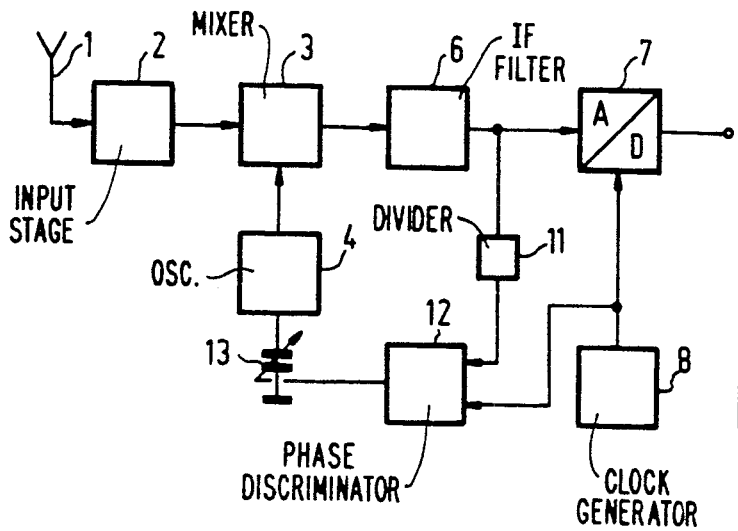
FIG. 3 shows a second embodiment of a television receiving section.

FIG. 3 shows a second embodiment of the television receiving section according to the invention in which it is assumed that a given predetermined sample clock of the A/D converter is used and in which provisions have been made to adjust the intermediate frequency and the sample clock at the desired numerical ratio.

Similarly as the television receiving section shown in FIG. 1, the television receiving section shown in FIG. 3 comprises an input stage 2, a mixer 3, an oscillator 4, an analog intermediate frequency filter 6, an A/D converter 7 and a clock generator 8.

The clock generator 8 may supply, for example, a clock frequency of 13.5 MHz with which the received television signal converted to the intermediate frequency and supplied by the IF filter 6 is sampled in the A/D converter 7. The frequency of the oscillator 4 is now to be adjusted in such a way that the intermediate frequency is exactly three times the sample clock supplied by the clock generator 8. To this end, the intermediate frequency at the output of the analog IF filter 6 is applied to a divider 11 whose output signal is applied to a phase discriminator 12. Moreover, the sample clock supplied by the clock generator 8 is applied to the phase discriminator 12. If, for example, the intermediate frequency is to be three times the frequency of the sample clock supplied by the clock generator 8, the intermediate frequency is divided by three in the divider circuit 11. If the intermediate frequency and the frequency of the sample clock have the desired ratio, the two input signals of the phase discriminator 12 should have the same frequency and also the same phase position. If this is not the case, the phase discriminator 12 supplies a corresponding correction signal which is used for correcting the frequency of the oscillator 4. This is diagrammatically shown in FIG. 3 in that the phase discriminator 12 acts on a variable capacitance 13 whose capacitance variation changes the frequency of the oscillator 4. Dependent on the frequency ratios of the divided intermediate frequency and the frequency of the sample clock, the phase discriminator thus supplies a correction signal which corrects the frequency of the oscillator 4 in such a way that the desired frequency ratio is always ensured.

We claim:

1. A television receiving section for receiving an analog television signal modulated on a carrier frequency, said signal being converted to an intermediate frequency by means of a mixer and subsequently selected in an intermediate frequency filter which is followed by an A/D converter controlled by a sample clock, characterized in that the intermediate frequency is an integral multiple of a frequency of the sample clock of the A/D converter such that the television signal appears at an output of the A/D converter at the intermediate frequency and also at baseband, whereby the A/D converter also performs a synchronous demodulation of the television signal.

2. A television receiving section as claimed in claim 1, characterized in that the frequency of the sample clock is ⅓ of the intermediate frequency.

3. A television receiving section as claimed in claim 1 or 2, characterized in that a signal processing operation of the television signal subsequent to the A/D converter is effected with an operating clock whose frequency is equal to the sample clock of the A/D converter.

4. A television receiving section as claimed in claim 1 or 2, characterized in that the A/D converter is followed by a clock rate converter.(9) by means of which the sample clock frequency is converted to a different operating clock frequency for a subsequent signal processing operation.

5. A television receiving section as claimed in claim 1 or 2, including an oscillator whose output signal is applied to the mixer, characterized in that a phase discriminator is provided which compares the sample clock frequency with the intermediate frequency which is divided in conformity with the desired numerical ratio between the sample clock frequency and the intermediate frequency, the output signal of said discriminator correcting the frequency of the oscillator in such a way that the intermediate frequency and the sample clock frequency have the desired numerical ratio with respect to each other.

6. A television receiving section as claimed in claim 1 or 2, characterized in that alternatively to the received television signal converted to the intermediate frequency an externally applied baseband television signal is converted to the digital range by means of the A/D converter.

7. A television receiving section as claimed in claim 3, including an oscillator whose output signal is applied to the mixer, characterized in that a phase discriminator is provided which compares the sample clock frequency with the intermediate frequency which is divided in conformity with the desired numerical ratio between the sample clock frequency and the intermediate frequency, the output signal of said discriminator correcting the frequency of the oscillator in such a way that the intermediate frequency and the sample clock frequency have the desired numerical ratio with respect to each other.

8. A television receiving section as claimed in claim 4, including an oscillator whose output signal is applied to the mixer, characterized in that a phase discriminator is provided which compares the sample clock frequency with the intermediate frequency which is divided in conformity with the desired numerical ratio between the sample clock frequency and the intermediate frequency, the output signal of said discriminator correcting the frequency of the oscillator in such a way that the intermediate frequency and the sample clock frequency have the desired numerical ratio with respect to each other.

9. A television receiving section as claimed in claim 3, characterized in that alternatively to the received television signal converted to the intermediate frequency an externally applied baseband television signal is converted to the digital range by means of the A/D converter.

10. A television receiving section as claimed in claim 4, characterized in that alternatively to the received television signal converted to the intermediate frequency an externally applied baseband television signal is converted to the digital range by means of the A/D converter.

11. A television receiving section as claimed in claim 7, characterized in that alternatively to the received television signal converted to the intermediate frequency an externally applied baseband television signal is converted to the digital range by means of the A/D converter.

12. A television receiving section as claimed in claim 8, characterized n that alternatively to the received television signal converted to the intermediate frequency an externally applied baseband television signal is converted to the digital range by means of the A/D converter.

* * * * *